(No Model.)

W. ABRAHART.
APPARATUS FOR MEASURING AND CUTTING OUT GARMENTS.

No. 272,611. Patented Feb. 20, 1883.

WITNESSES:
Donn Twitchell
C. Sedgwick

INVENTOR:
W. Abrahart
BY Munn & Co
ATTORNEYS.

UNITED STATES PATENT OFFICE.

WILLIAM ABRAHART, OF CINCINNATI, OHIO.

APPARATUS FOR MEASURING AND CUTTING OUT GARMENTS.

SPECIFICATION forming part of Letters Patent No. 272,611, dated February 20, 1883.

Application filed October 6, 1882. (No model.)

*To all whom it may concern:*

Be it known that I, WILLIAM ABRAHART, of Cincinnati, in the county of Hamilton and State of Ohio, have invented a new and Improved Apparatus for Measuring and Cutting Out Garments, of which the following is a full, clear, and exact description.

The object of my invention is to furnish an instrument for the use of tailors and cutters by which the measure can be taken for the body of a coat or similar garments and readily transferred to paper without requiring calculations or divisions of any kind, as is usual with most systems now in use.

The invention consists in a mechanical instrument which is first placed to find a center, and the different measurements from the center are then taken, so that by afterward applying the instrument upon a sheet of paper the pattern can be readily marked out, so as to insure a perfect fit upon regular or irregular forms, as set forth more particularly hereinafter.

Reference is to be had to the accompanying drawings, forming part of this specification, in which similar letters of reference indicate corresponding parts in all the figures.

Figure 1:
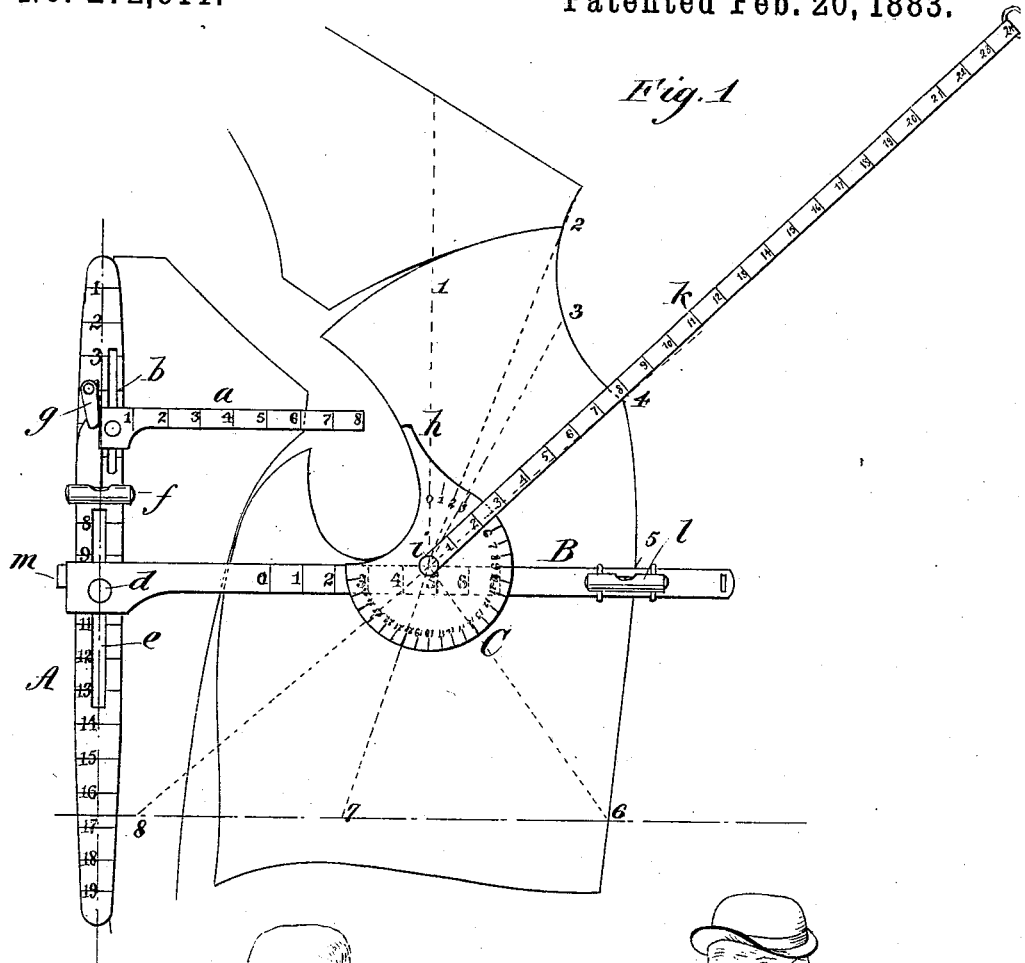
Figures 2, 3:
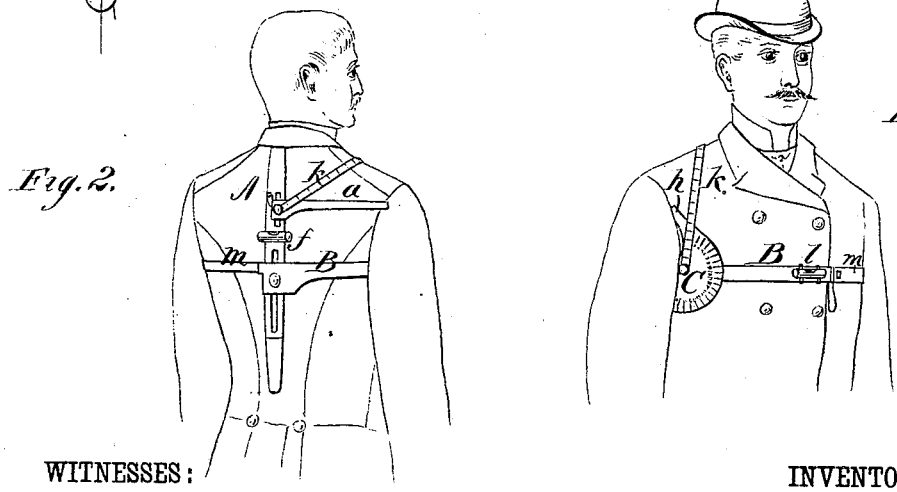

Figure 1 is a plan view of my improved apparatus as applied for making a pattern. Figs. 2 and 3 show the application of the instrument for taking measurements on the person.

The apparatus is composed of three principal parts—a perpendicular bar, A, a horizontal flexible bar, B, and an indicator or center piece, C. The perpendicular bar A (shown most clearly in Fig. 1) has attached to its upper end a blade, *a*, which is fitted for vertical adjustment in a slot, *b*, in the bar A. This blade is for finding the shoulder-point and the width of the back. The horizontal bar B is also attached by a pin, *d*, in a slot, *e*, in the bar A, so that it may be adjusted thereon. The bar A is further provided with a spirit-level, *f*, and a small catch, *g*, that is for use in measuring round or irregular shoulders. The bar A is flexible from the level *f* upward, and the catch *g* holds the flexible portion upright. When the catch is released the bar A can be bent to the shape of the shoulders, while the portion below the spirit-level remains vertical. The center piece, C, is attached upon the horizontal bar B, so that it may be moved endwise of the said bar. This piece forms about three-fourths of a circle, the other portion being cut out to the shape of the armhole and provided with a tongue, *h*, at the top for extending in front of the shoulder. The face of the center piece, C, is marked with radial lines that are numbered. At its center is a pin, *i*, to which is attached one end of a tape-measure, *k*, made preferably of steel. Upon the outer end of the horizontal bar B is a spirit-level, *l*, and to the end next the perpendicular bar A is attached an elastic band, *m*, which is used for fastening the apparatus in place. The perpendicular bar A, the horizontal bar B, and the blade *a* are all marked with a scale graduated in inches.

In using the instrument it is attached by pinning the upper end of the bar A at the neck of the person, at the back, the elastic band *m* being also passed around the chest and connected to the outer end of the bar B, as illustrated in Figs. 2 and 3. By aid of the level *f* the bar A can be perpendicularly adjusted and the bar B brought to a perfectly horizontal position by the aid of the level *l*. The center piece, C, is then to be moved on the bar B until its tongue takes at the front of the shoulder. The blade *a* is adjusted to find the shoulder-point, and it also gives the width at the back, which is indicated upon the scale upon the blade. The pivot-pin *i* of the tape-measure *k* now forms the center from which all the measurements are to be taken. The several measurements required are now taken by means of the tape-measure *k*—the first one from the center piece, C, straight over the shoulder to the center of the back, as indicated by the position of the tape-measure in Figs. 2 and 3, and by the dotted line 1 in Fig. 1; the second one to the point 2, which is the top of the back; the third one to the point marked 3, which is the hollow of the neck; the fourth one to the point marked 4, which indicates the throat or top of the breast; the fifth one to the point marked 5, which is in line with the top of the horizontal bar, and indicates the center of the breast; the sixth one to a point marked 6, which indicates the center of the waist-line; the seventh one to a point marked 7, which indicates the hip-joint on the waist-line; and the eighth one to a point marked 8, which is on the waist-line at the center of the back. In taking these measurements the tape is upon the radial lines of the center piece, C, and these lines, being numbered, serve as a guide in adjusting the tape when the pattern is transferred. The measurements being taken in this manner and a record of them made, the apparatus may be laid upon a sheet of paper and the pattern cut out, as shown in Fig. 1. It will be seen that no calculations or divisions are required, the operation being entirely mechanical in marking out the pattern, although the cutter is at liberty to exercise his skill in order to give any particular shape to the garment, and for other contingencies, as will be well understood by any one skilled in the art.

With this apparatus a garment may be made to properly fit shoulders that are more or less round.

It will be noticed that no breast measurement is required, as the instrument can be adjusted to any size breast.

Having thus fully described my invention, I claim as new and desire to secure by Letters Patent—

1. The apparatus for measuring and cutting garments, consisting of the perpendicular bar A, the horizontal and adjustable bar B, the adjustable blade $a$, the adjustable center piece, C, having one side cut away to the shape of the armhole, and the tape-measure $k$, substantially as described, combined for use as set forth.

2. In apparatus for measuring garments, the center piece, C, formed with the tongue $h$, in combination with the horizontal bar B, on which it is adjustable, substantially as described.

3. In apparatus for measuring garments, the center piece, C, provided with the tongue $h$, and the pivoted tape-measure $k$, in combination with the horizontal bar B, substantially as and for the purpose set forth.

4. In apparatus for measuring garments, the catch $g$, in combination with the perpendicular bar A and adjustable blade $a$, substantially as shown, and for the purpose set forth.

5. In an apparatus for measuring, the combination, with the vertical bar A, provided with the spirit-level $f$, and the flexible horizontal bar B, adjustably secured to said vertical bar and provided with the spirit-level $l$, of the adjustable center piece provided with the tongue $h$ and the pivoted tape-measure $k$, substantially as and for the purpose set forth.

WILLIAM ABRAHART.

Witnesses:
  THOMAS KEY,
  G. W. SARGENT.